3,223,583
CYCLOHEXIMIDE SEMICARBAZONE EMULSIONS

Gerald A. Boyack, Kalamazoo, Mich., assignor to The Upjohn Company, Kalamazoo, Mich., a corporation of Delaware
No Drawing. Filed Oct. 24, 1960, Ser. No. 64,266
14 Claims. (Cl. 167—33)

This invention relates to a process for the control of fungal infections of conifers in coniferous forests and to compositions therefor. It is particularly directed to a process in which an oil-in-water emulsion containing finely-dispersed cycloheximide semicarbazone is sprayed on the foliage from above.

Fungal diseases which infect conifers in coniferous forests have in more recent years presented a tremendous economic problem in forest management. Blister rust, a fungal infection of five-needled pines, particularly of white pine, is the most notorious if not the most widespread of such infections. Other such fungal diseases of economic importance include shoestring root rot of five-needled pines; needle blight, Western gall rust, and paintbrush blister rust of ponderosa pine; comandrae blister rust of lodgepole pine; fusiforme rust of slash pine and loblolly pine; needle cast of Douglas fir; yellow witch's broom of alpine fir; sweetfern rust of jack pine and Austrian pine; cytospora canker of Norway spruce and hemlock; cedar gall rust of Eastern red cedar; and juniper blight of juniper. In general these various diseases have constituted a serious economic problem in forest management and in particular blister rust has virtually threatened the white pine industry with extinction.

Recently it has been discovered that control of blister rust and other fungal infections of conifers in coniferous forests can be effected by the use of cycloheximide. The methods heretofore available and effective for this purpose, however, have been expensive and time consuming. As effective as cycloheximide has proven to be, there has been a recognized need in the art for a more effective and/or economically feasible process for the control of infections of conifers in coniferous forests.

It has now been found in accordance with the present invention that effective and economic control of fungal infections of conifers in coniferous forests is obtained by aerially spraying the foliage from above with an oil-in-water emulsion, the dispersed phase of which contains in addition to the oil globules, finely-dispersed cycloheximide semicarbazone as active fungicidal ingredient. It has been found that when such oil-in-water emulsions are sprayed on the foliage of conifers in coniferous forests by means of airplanes, either fixed wing or helicopters, the particles of the atomized emulsion containing cycloheximide semicarbazone infiltrate the foliage and are deposited on the foliage and various other parts of the trees in such a manner as to provide a concentration of cycloheximide semicarbazone effective for the control of blister rust and other types of fungal infections infesting conifers in coniferous forests. The process and compositions of the invention, therefore, make it possible effectively and economically to treat large areas of coniferous forests for the control of fungal infections of conifers.

In carrying out the process of the invention, finely-divided cycloheximide semicarbazone is incorporated in an oil-in-water emulsion suitable for foliage spraying, and the emulsion is applied to conifers as described above. The finely-divided cycloheximide semicarbazone is incorporated in the oil-in-water emulsion in any suitable way, but most advantageously by first preparing a concentrated suspension of the finely-divided cycloheximide semicarbazone in oil (A and B below) or other inert liquid suspending medium (C, D, and E below) and incorporating the concentrate in oil just before the emulsion is made, or by preparing a concentrated solution of cycloheximide semicarbazone in a solvent (F and G below). Ordinarily it is preferred for reasons of convenience to include an emulsifier in the concentrate, i.e., concentrated suspension or solution. This is not a necessary condition, however, since the concentrate and the emulsifier can be added separately to the tank-mix in which the antifungal oil-in-water emulsions of the invention are prepared. Water-miscible inert solvents are preferred for the preparation of the concentrated solutions, and when an emulsifier is included in the concentrate it is preferred that the solvent be a mutual solvent for cycloheximide semicarbazone and the emulsifier. The resulting concentrate, however prepared, is added to and intimately mixed with the dispersion medium or the prepared emulsion, preferably the latter when the concentrate does not contain an emulsifier. When the latter type concentrate is added the cycloheximide semicarbazone ordinarily precipitates in situ in microcrystalline or semicolloidal form and any particles of cycloheximide semicarbazone which remain undissolved become suspended either during the emulsification or the agitation commonly used during application to prevent such emulsions from creaming.

Suitable concentrates for use in preparing the emulsions of this invention include suspensions of the kind noted above, illustratively.

A.
| | Percent |
|---|---|
| Cycloheximide semicarbazone | 1 to 10 |
| Oil | 20 to 69 |
| Emulsifier | 30 to 79 |

The cycloheximide semicarbazone is comminuted to less than 60 microns, preferably to an average particle size of 1 to 10 microns. An oil-soluble emulsifier is preferred (it need not all be dissolved) as it tends to stabilize the suspension of cycloheximide semicarbazone in the concentrate and provides for quick and easy emulsification.

B.
| | Percent |
|---|---|
| Cycloheximide semicarbazone | 1 to 20 |
| Oil | 80 to 99 |

The cycloheximide semicarbazone is comminuted as in (A) above. Preferably the oil is a non-volatile, non-phytotoxic oil of the kind described below for preparing the oil-in-water emulsions, i.e., spray formulations, of the invention. Other hydrocarbon oils which differ (e.g., as to volatility and/or aromatic content) can be used, however, because the oil component of the concentrate will be present in only minor amount in the spray formulation. The same considerations apply to (A) above.

C.
| | Percent |
|---|---|
| Cycloheximide semicarbazone | 1 to 10 |
| Liquid suspending medium | 20 to 69 |
| Emulsifier | 30 to 79 |

The cycloheximide semicarbazone is comminuted as in (A) above. Preferably the liquid suspending medium is one in which the emulsifier is appreciably soluble but in which the cycloheximide semicarbazone is substantially insoluble, illustratively, methylene chloride, ethylene dichloride, perchloroethylene, sym.-tetrachloroethane, chloroform, and like chlorinated aliphatic hydrocarbons, and ethyl acetate, amyl acetate, ethyl butyrate, and like esters, the chlorinated aliphatic hydrocarbons being somewhat preferred.

D.

| | Percent |
|---|---|
| Cycloheximide semicarbazone | 1 to 20 |
| Liquid suspending medium | 80 to 99 |

The cycloheximide semicarbazone is comminuted as in (A) above. Liquid suspending media of the kind set forth in (C) above are preferred.

E.

| | Percent |
|---|---|
| Cycloheximide semicarbazone | 1 to 20 |
| Liquid emulsifier | 80 to 99 |

The cycloheximide semicarbazone is comminuted as in (A) above. The active ingredient need not be entirely insoluble in the liquid emulsifier.

Suitable concentrates for use in preparing the emulsions of this invention also include solutions of the kind noted above, illustratively:

F.

| | Percent |
|---|---|
| Cycloheximide semicarbazone | 1 to 10 |
| Emulsifier | 30 to 79 |
| Water-miscible mutual solvent | 20 to 69 |

This concentrate is a homogeneous liquid which on mixing with the dispersion medium or prepared emulsion gives a highly effective spray formulation for controlling fungal infections of conifers. Suitable water-miscible, mutual solvents include dimethyl sulfoxide and dimethylformamide.

G.

| | Percent |
|---|---|
| Cycloheximide semicarbazone | 1 to 20 |
| Water-miscible solvent | 80 to 99 |

This concentrate is a homogeneous liquid which on mixing with water, oil, and emulsifier gives a highly effective spray formulation for controlling fungal infections of conifers. Suitable water-miscible solvents include those set forth in (F) above.

The oil used in preparing the oil-in-water emulsion can be any non-volatile, non-phytotoxic oil. For economic reasons the non-volatile, non-aromatic mineral oils are preferred. By non-volatile is meant oils having less volatility than the so-called dry-cleaning solvents which have a boiling range of 300–400° F. (ASTM D484–4). Advantageously, however, it is more volatile than No. 2 fuel oil (boiling range 450–675° F.). Non-aromatic, mineral oils like No. 1 fuel oil and kerosene which have a boiling range in the order of 350 to 550° F. are most suitable. Heavier oils such as No. 2 fuel oil and the summer oils used in agricultural sprays can also be used but generally give lower efficiency.

The concentration of oil in the emulsion can be varied over a wide range, say from about 5 to about 30%. Even higher concentrations, say up to about 50%, can be used, but ordinarily such higher concentrations are unnecessary. Emulsions containing about 20% oil have been found particularly effective both in keeping any solid particles of cycloheximide semicarbazone suspended in the emulsion and easily redispersible therein and in providing adequate coverage of the foliage and other parts of the trees contacted by the emulsion spray.

In preparing the oil-in-water emulsion the usual emulsifying agents and techniques for preparing oil-in-water emulsions can be used. Advantageously those emulsifying agents which produce stable emulsions in contrast to the so-called quick-breaking emulsions sometimes used in the agricultural spray art are employed. Suitable emulsifying agents include nonionic surfactants such as polyoxyethylene sorbitol fatty acid esters (Altox 1086), polyglycol esters of fatty acids (emulsifiers 2, 3, and M–0–1, Kessler Chemical Co.), fatty acid alkanolamides (Ninol 201), polyethoxy esteramides (Leyco E–150), alkyl phenyl polyethylene glycol ethers (Tergitol NPX, Tergitol NP–27, Triton NP–56, Triton X–45, Triton X–100, Triton X–155 and Hyonic PE–30), and modified phthalic glycerol alkyd resins (Triton B–1956); anionic surfactants such as ethylene oxide aromatic sulfonate condensates (Agrimul GA), amine salts of fatty alcohol sulfates (Duponol G), and amine salts of alkylaryl sulfonates (Ninate 411, Trepolate-YLA); and blends of sulfonated oils and polyalcohol carboxylic acid esters (Emcol H–77), blends of polyoxyethylene ethers and oil-soluble sulfonates (Emcol H–400), blends of alkylarylsulfonates and alkylphenoxy polyethoxy ethanols (Tritons X–151, X–161, and X–171), e.g., about equal parts of sodium kerylbenzene sulfonate and isooctylphenoxypolyethoxyethanol containing about 12 ethoxy groups, and blends of calcium alkylarylsulfonates and polyethoxylated vegetable oils (Agrimul $N_4S$).

The concentration of cycloheximide semicarbazone present in the oil-in-water emulsion spray can vary considerably. Ordinarily, for effective control of fungal infection, the concentration should not be less than about 50 parts per million (0.005%). Higher concentrations of cycloheximide semicarbazone, say up to about 1000 parts per million (0.1%), can be used but ordinarily it will not be necessary or desirable to exceed about 500 parts per million (0.05%).

The invention may be more fully understood by the following examples which are illustrative of the process and compositions of the invention but which are not to be construed as limiting. Parts and percentages given herein are by weight unless otherwise specified.

*Example 1*

To a 20% (v./v.) oil-in-water emulsion obtained by emulsifying No. 1 fuel oil (No. 1 stove oil) with a blend of calcium alkylarylsulfonate and polyethoxylated vegetable oil (Agrimul $N_4S$) was added the following concentrated suspension:

| | Percent |
|---|---|
| Cycloheximide semicarbazone (comminuted to an average particle size of 7 microns) | 12 |
| Mineral spirits | 88 |

The concentrate was added to separate tanks of emulsion in proportions to give three sprays, (A) 100 parts per million of cycloheximide semicarbazone, (B) 200 parts per million cycloheximide semicarbazone, and (C) 400 parts per million cycloheximide semicarbazone.

The three separate sprays, (A), (B), and (C), were then applied to separate areas of Western white pine infected with blister rust as an aerial spray from an airplane. Application was made at the rate of 10 gallons of spray solution per acre. After 12 months the following control, based on the number of cankers (both branch and trunk) that were killed, was noted:

| | Percent |
|---|---|
| A | 61.5 |
| B | 88.7 |
| C | 84.9 |

These data show that representative oil-in-water emulsions containing finely-dispersed cycloheximide semicarbazone as active fungicidal ingredient provide effective control of blister rust on aerial application of the emulsion by spraying from above by means of an airplane.

If desired, the emulsifier can be incorporated in the oil (mineral spirits) concentrate. Likewise, methylene chloride or like chlorinated aliphatic hydrocarbon can be substituted for the oil.

*Example 2*

To a stirred mixture of 20 parts by volume of No. 1 fuel oil and 80 parts by volume of water is added 1 part by volume of the following concentrated solution:

| | Percent |
|---|---|
| Cycloheximide semicarbazone | 3 |
| Agrimul $N_4S$ | 55 |
| Dimethylformamide | 42 |

This emulsion, which contains 300 parts per million of the active ingredient, is sprayed from an airplane on Western white pine infected with blister rust as in Example 1 with like results.

In place of dimethylformamide, dimethyl sulfoxide can be used.

In the following table there are listed various species of conifers together with the type of disease and causative organism.

TABLE

| Host: | Disease |
|---|---|
| Western white pine, *Pinus monticola* | Blister rust, *Cronartium ribicola;* Shoestring root rot, *Armillaria mellea.* |
| Sugar pine, *P. lambertiana* | Do. |
| Eastern (Northern) white pine, *P. strobus* | Do. |
| Limber pine, *P. flexilis* | Do. |
| White-bark pin, *P. albacaulis* | Do. |
| Ponderosa pine, *P. ponderosa* | Needle blight, *Elytroderma deformans;* Western gall rust, *C. harknessii;* Paintbrush blister rust, *C. filamentosum.* |
| Lodgepole pine, *P. contorta* | Comandrae blister rust, *C. comandrae.* |
| Slash pine, *P. caribaea* | Fusiforme rust, *C. fusiforme.* |
| Loblolly pine, *P. taeda* | Do. |
| Douglas fir, *Pseudotsuga taxifolia* | Needle cast, *Rhabdocline pseudotsugae.* |
| Alpine fir, *Abies lasiocarpa* | Yellow witch's broom, *Melampsorella caryophyllacearum.* |
| Jack pine, *P. banksiana* | Sweetfern rust, *C. comptoniae.* |
| Austrian pine, *P. nigra* | Do. |
| Norway spruce, *Picea abies* | Cytospora canker, *Cytospora kunzei.* |
| Hemlock, *Tsuga sp.* | Do. |
| Eastern red cedar, *Juniperus virginiana* | Cedar gall rust, *Gymnosporangium juniperi-virginianae* and *G. globosum.* |
| Juniper, *Juniperus sp.* | Juniper blight, *Phomopsis juniperovora.* |

Spray emulsions prepared as in Examples 1 and 2 can be applied to forests containing one or more of the various hosts noted in the above table for the control of the several diseases there noted.

It is to be understood that the invention is applicable both to naturally wooded areas and planted areas and that the term "forest" as used herein is intended to cover both as long as there is an aggregate of trees such as to make aerial spraying from an airplane economically desirable.

The invention having been thus fully described, what is claimed is:

1. A process for the control of fungal infections of conifers in coniferous forests which comprises aerially spraying the foliage from above with an oil-in-water emulsion, the dispersed phase of which contains in addition to oil globules, finely dispersed cycloheximide semicarbazone having a particle size less than 60 microns.

2. The process of claim 1 in which the emulsion contains from 5 to 30% oil and from 0.005 to 0.05% cycloheximide semicarbazone.

3. The process of claim 2 in which the oil is a non-volatile, non-aromatic mineral oil having a boiling range of about 350 to 550° F.

4. The process of claim 3 in which the emulsion contains solid particles of cycloheximide semicarbazone having a particle size less than 10 microns.

5. A fungicidal composition comprising an oil-in-water emulsion, the dispersed phase of which contains in addition to oil globules, finely dispersed cycloheximide semicarbazone having a particle size less than 60 microns.

6. A composition according to claim 5 in which the emulsion contains from 5 to 30% oil and from 0.005 to 0.05% cycloheximide semicarbazone.

7. A composition according to claim 6 in which the oil is a non-volatile, non-aromatic mineral oil having a boiling range of about 350 to 550° F.

8. A composition according to claim 7 in which the emulsion contains solid particles of cycloheximide semicarbazone having a particle size less than 10 microns.

9. A composition of matter comprising a 1 to 20 percent suspension of finely divided cycloheximide semicarbazone having a particle size less than 60 microns in an inert liquid suspending medium.

10. The composition of claim 9 in which the suspending medium is a hydrocarbon oil.

11. The composition of claim 10 in which the suspension contains from about 10% cycloheximide semicarbazone.

12. The composition of claim 11 in which the suspension contains an oil-soluble emulsifying agent.

13. The composition of claim 9 in which the suspending medium is a chlorinated aliphatic hydrocarbon.

14. The method of preparing an oil-in-water emulsion containing cycloheximide semicarbazone which comprises preparing a concentrated suspension of finely divided cycloheximide semicarbazone in oil, diluting the concentrate with further oil, incorporating an emulsifier and then emulsifying with water.

References Cited by the Examiner

UNITED STATES PATENTS 2,980,580  4/1961  Kloparens _____ 167—33
3,014,840  12/1961  Vellaire _____ 167—33
3,086,913  4/1963  Hamilton et al.

OTHER REFERENCES

Frear, Chemistry of Insecticides, Fungicides and Herbicides, 2nd Ed., 1948, published by D. Van Nostrand Co. Inc., New York, pages 287–289.

Hamilton et al., Science, vol. 123, June 29, 1956, pages 1175–6.

Hamilton et al., "Systemic Control of Cherry Leaf-Spot Fungus by Foliar Sprays of Actidione Derivatives," Science, vol. 123, June 29, 1956, pages 1175–6.

Moss, vol. 42, No. 5, Plant Disease Reporter, May 15, 1958, pages 703–704.

Strong et al., "The Control of Red Cedar Apple and Hawthorn Rusts with Acti-Dione," vol. 29, No. 7, Plant Disease Reporter, July 15, 1955, page 569.

Wicker et al., Plant Disease Reporter, vol. 45, No. 9, Sept. 15, 1961, pages 722–724.

LEWIS GOTTS, *Primary Examiner.*

WILLIAM B. KNIGHT, M. O. WOLK, IRVING MARCUS, *Examiners.*